(12) United States Patent
Mo et al.

(10) Patent No.: US 9,189,117 B2
(45) Date of Patent: Nov. 17, 2015

(54) TOUCH DISPLAY DEVICE (71) Applicant: FocalTech Systems, Ltd., Grand Cayman (KY)

(72) Inventors: Lianghua Mo, Shenzhen (CN); Guang Ouyang, Shenzhen (CN)

(73) Assignee: Focaltech Electronics, LTD., Grand Cayman (KY)

( * ) Notice: Subject to any disclaimer, the term of this patent is extended or adjusted under 35 U.S.C. 154(b) by 27 days.

(21) Appl. No.: 14/107,538

(22) Filed: Dec. 16, 2013

(65) Prior Publication Data

US 2015/0035791 A1 Feb. 5, 2015

(30) Foreign Application Priority Data

Aug. 2, 2013 (CN) .......................... 2013 1 0335041

(51) Int. Cl.
*G06F 3/045* (2006.01)
*G06F 3/044* (2006.01)
*G09G 3/36* (2006.01)
*G06F 3/0488* (2013.01)

(52) U.S. Cl.
CPC .............. *G06F 3/044* (2013.01); *G06F 3/0488* (2013.01); *G09G 3/3648* (2013.01)

(58) Field of Classification Search
None
See application file for complete search history.

(56) References Cited

U.S. PATENT DOCUMENTS

| 5,844,175 | A | 12/1998 | Nakanishi et al. |
|---|---|---|---|
| 7,663,607 | B2 | 2/2010 | Hotelling et al. |
| 8,120,592 | B2 | 2/2012 | Lo et al. |
| 8,125,463 | B2 | 2/2012 | Hotelling et al. |
| 8,416,209 | B2 | 4/2013 | Hotelling et al. |
| 8,605,051 | B2 | 12/2013 | Hotelling et al. |
| 8,780,071 | B2 | 7/2014 | Chen et al. |
| 8,786,571 | B2 | 7/2014 | Koito et al. |
| 8,872,785 | B2 | 10/2014 | Hotelling et al. |
| 8,928,618 | B2 | 1/2015 | Hotelling et al. |
| 8,933,351 | B2 | 1/2015 | Noguchi et al. |
| 8,982,087 | B2 | 3/2015 | Hotelling et al. |
| 9,035,907 | B2 | 5/2015 | Hotelling et al. |

(Continued)

FOREIGN PATENT DOCUMENTS

| JP | H05134805 A | 6/1993 |
|---|---|---|
| JP | 2010039380 A | 2/2010 |

(Continued)

OTHER PUBLICATIONS

Japanese Office Action dated Feb. 24, 2015 regarding Japanese Application No. 2014-046544. Translation provided by Unitalen Attorneys at Law.

(Continued)

*Primary Examiner* — Muhammad N Edun
(74) *Attorney, Agent, or Firm* — Harness, Dickey & Pierce, P.L.C.

(57) ABSTRACT

A touch control display device is provided according to embodiments of the disclosure. The touch control display device includes: a first substrate, a second substrate, a liquid crystal layer disposed between the first substrate and the second substrate, a common electrode and a plurality of pixel units; and a plurality of touch sensing electrodes disposed above the common electrode, where the plurality of touch sensing electrodes are arranged in a two-dimensional array. With the solution according to the embodiments of the disclosure, the noise can be reduced and the frame rate of touch detection scan can be enhanced.

14 Claims, 4 Drawing Sheets

(56) References Cited

U.S. PATENT DOCUMENTS

| | | |
|---|---|---|
| 2006/0097991 A1 | 5/2006 | Hotelling et al. |
| 2009/0096757 A1 | 4/2009 | Hotelling et al. |
| 2009/0096758 A1 | 4/2009 | Hotelling et al. |
| 2010/0033448 A1 | 2/2010 | Koito et al. |
| 2010/0128000 A1 | 5/2010 | Lo et al. |
| 2010/0194709 A1* | 8/2010 | Tamaki et al. ............... 345/174 |
| 2011/0192657 A1 | 8/2011 | Chen et al. |
| 2011/0267295 A1 | 11/2011 | Noguchi et al. |
| 2012/0105371 A1 | 5/2012 | Hotelling et al. |
| 2013/0106780 A1 | 5/2013 | Hotelling et al. |
| 2014/0062955 A1 | 3/2014 | Hotelling et al. |
| 2014/0078108 A1 | 3/2014 | Hotelling et al. |
| 2014/0300577 A1 | 10/2014 | Hotelling et al. |
| 2014/0300578 A1 | 10/2014 | Hotelling |
| 2015/0070314 A1 | 3/2015 | Noguchi et al. |

FOREIGN PATENT DOCUMENTS

| | | | |
|---|---|---|---|
| JP | 2011081825 A | 4/2011 | |
| JP | 2011233019 A | 11/2011 | |
| KR | 20100019367 A | 2/2010 | |
| TW | 200943158 A | 10/2009 | |
| TW | 201025100 A | 7/2010 | |
| TW | 201128502 A | 8/2011 | |
| TW | 1372284 | 9/2012 | |

OTHER PUBLICATIONS

NXP, "Chip-On-Glass (COG) for LCD modules", http://www.nxp.com/documents/white_paper/NXP_COG_WhitePaper.pdf, dated Sep. 20, 2012.

Samsung, "Chip on Glass," www.samsung.com/global/business/semiconductor/support/package-info/packagedatasheet/various-packages/cog, Jun. 30, 2015.

NXP, "Chip-on-Glass LCD Driver Technology", http://www.nxp.com/documents/white_paper/LCD_WhitePaper_D3.pdf, dated Jul. 2012.

First Korean Office Action regarding Application No. 10-2014-0036940, dated Jun. 30, 2015. English translation provided by Unitalen Attorneys at Law.

First Taiwanese Office Action regarding Application No. 102128283, dated Jul. 16, 2015. English translation provided by Unitalen Attorneys at Law.

* cited by examiner

TOUCH DISPLAY DEVICE

CROSS REFERENCE TO RELATED APPLICATION

The present application claims the priority to Chinese Patent Application No. 201310335041.1, entitled as "TOUCH DISPLAY DEVICE", filed on Aug. 2, 2013 with State Intellectual Property Office of PRC, which is incorporated herein by reference in its entirety.

FIELD OF THE DISCLOSURE

The invention relates to the touch control technology, in particular, to a touch display device.

BACKGROUND OF THE DISCLOSURE

Currently, capacitive touch screens are widely used to various electronic products, and gradually become popular in our work and life. The size of capacitive touch screen is progressively increased, for example, from 3 inches to 6.1 inches of a smart phone, to 10 inches of a tablet. The application of capacitive touch screens may extend into smart TV. However, the existing capacitive touch screens generally have the problems of a poor anti-interference performance, a low scanning frame rate for touch detection, a large size and a complicated manufacturing process.

SUMMARY OF THE DISCLOSURE

Accordingly, a touch control display device is provided according to embodiments of the disclosure, where the touch display device may solve at least one of the problems above.

The touch control display device according to the embodiments of the disclosure includes:

a first substrate, a second substrate, a liquid crystal layer disposed between the first substrate and the second substrate, a common electrode and a plurality of pixel units; and a plurality of touch sensing electrodes disposed above the common electrode, where the plurality of touch sensing electrodes are arranged in a two-dimensional array and are located on a side of the common electrode facing the liquid crystal layer.

Any of the touch sensing electrodes may be equilateral polygonal, rhombic, elongated, circular or elliptic.

Optionally, the touch sensing electrodes are in a concave and convex structure.

The plurality of touch sensing electrodes may be made of Indium Tin Oxide (ITO) or Graphene.

Preferably, the touch control display device further includes:

a touch control chip, where the touch control chip is connected to each of the touch sensing electrodes via wires respectively and is bound onto the first substrate or the second substrate with a Chip-on-Glass mode.

Preferably, the wires and the plurality of touch sensing electrodes are arranged on a same layer; or the wires are arranged on a different layer from the plurality of touch sensing electrodes and are connected to the plurality of touch sensing electrodes through vias.

The touch control display device may further comprise:

a Flexible Printed Circuit, where the Flexible Printed Circuit is bound onto the first substrate or the second substrate and is connected to the touch control chip.

Preferably, the touch control chip is configured to detect the self capacitance of each touch sensing electrode and to determine a touch location based on a two-dimensional self capacitance sensing array.

The touch control chip may comprise:

a driving/receiving unit, configured to drive the touch sensing electrodes with a voltage source or current source and to receive sensing data from the touch sensing electrodes; and a signal processing unit, configured to calculate the self capacitance of each touch sensing electrode based on the sensing data.

Preferably, the driving/receiving unit is configured to drive the touch sensing electrodes with a simultaneous driving mode.

The sensing data may represent voltages, frequencies or electric quantities of the touch sensing electrodes.

The voltage source or current source may have two or more frequencies.

Preferably, the touch control chip is configured to detect the self capacitances of all the touch sensing electrodes simultaneously or to detect the self capacitances of the touch sensing electrodes group by group.

The touch control chip may be further configured to adjust sensitivity and/or dynamic range of touch detection through parameters of the voltage source or current source, and the parameters comprise one of amplitude, frequency, time sequence or any combination thereof.

Preferably, the touch control display device has an In-Plane Switching structure and the plurality of touch sensing electrodes are located on a side of the common electrode facing the liquid crystal layer; or the touch control display device has a Twisted Nematic structure and the plurality of touch sensing electrodes are located on the other side of the common electrode opposite to the side facing the liquid crystal layer.

In the solution according to the embodiments of the disclosure, the touch sensing electrodes arranged in a two-dimensional array are disposed on the common electrode of a liquid crystal display, and the problem that an error is caused by noises accumulation on electrodes in the prior art is solved under the pre-condition of achieving real multi-touch. With the solution according to the embodiments of the disclosure, effect caused by power supply noise may be significantly removed, and interference of Radio Frequency (RF) and interference from the liquid crystal display, etc. may be further reduced.

In addition, with the solution according to the embodiments of the disclosure, the plurality of touch sensing electrodes may be detected simultaneously; therefore, time for one touch detection scan is reduced and the frame rate of touch detection scan is enhanced.

BRIEF DESCRIPTION OF THE DRAWINGS

Drawings used in the description of embodiments are explained briefly as follows for better understanding of technical solution according to embodiments of the disclosure. Apparently, the drawings described in the following are just some of the embodiments of the invention. Other drawings can be obtained by those skilled in the art based on the drawings without inventive efforts.

DETAILED DESCRIPTION

For better understanding of technical solution in the disclosure by those skilled in the art, the technical solution in embodiments of the disclosure is described hereinafter in conjunction with drawings. Apparently, the embodiments described are merely some embodiments of the invention, rather than all embodiments. Any other embodiments obtained based on the embodiments of the disclosure by those skilled in the art without inventive efforts should fall in the scope of the invention. For convenience of illustration, sectional views showing the structure of a device are enlarged partially and are not drawn to scale. The drawings are exemplary and are not intended to limit the scope of the invention. Furthermore, in actual manufacture process, three-dimension sizes, i.e. length, width and depth should be considered.

Embodiment 1

Figure 1A:
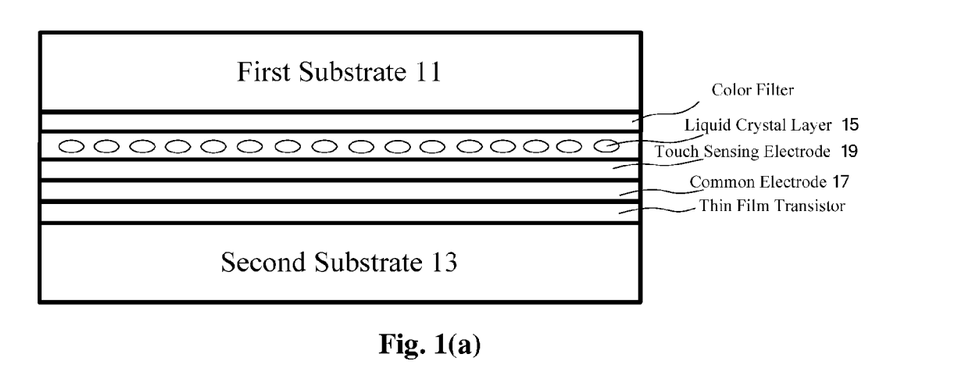
FIG. 1(a) and FIG. 1(b) are schematic side views of a touch control display device according to embodiment 1 of the disclosure.
Figure 1B:
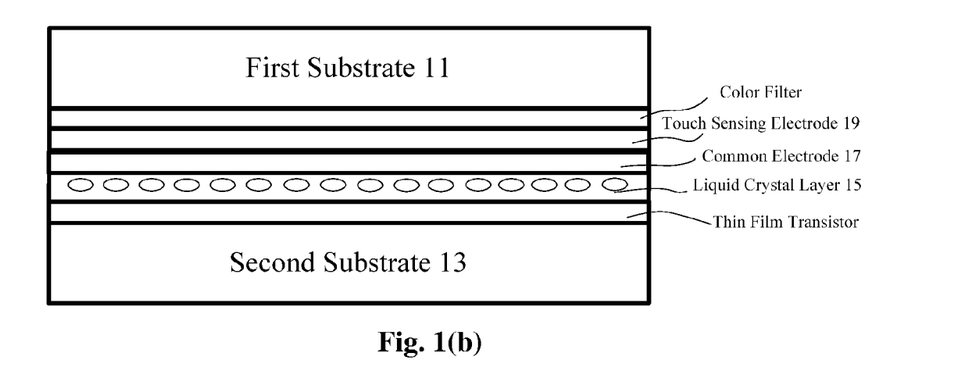

A touch control display device is provided according to embodiment 1 of the disclosure, where the touch display device includes:

a first substrate 11, a second substrate 13, a liquid crystal layer 15 disposed between the first substrate and the second substrate, a common electrode 17 and a plurality of pixel units; and a plurality of touch sensing electrodes 19 disposed above the common electrode 17, where the plurality of touch sensing electrodes 19 are arranged in a two-dimensional array.

The touch control display device may has an In-Plane Switching (IPS) structure, where the plurality of touch sensing electrodes are located on a side of the common electrode facing the liquid crystal layer. The touch display device may alternatively has a Twisted Nematic (TN) structure, where the plurality of touch sensing electrodes are located on the other side of the common electrode opposite to the side facing the liquid crystal layer.

FIG. 1(a) is a schematic side view of one example of the touch control display device according to embodiment 1 of the disclosure. Here the touch control display device has the IPS structure.

FIG. 1(b) is a schematic side view of another example of the touch control display device according to embodiment 1 of the disclosure. Here the touch control display device has the TN structure.

The common electrode 17 belongs to a liquid crystal display portion of the touch control display device. The common electrode 17 is driven by a common voltage (Vcom). The common electrode, in combination with different pixel units, creates an electric field across the liquid crystal material at different regions on the screen, so as to control luminous flux in different regions.

As an example, the touch control display device shown in FIG. 1(a) and FIG. 1(b) further includes a color filter. Each pixel unit includes three pixel sub-units, corresponding to red, green and blue respectively, where each pixel sub-unit includes a Thin Film Transistor.

Figure 1C:
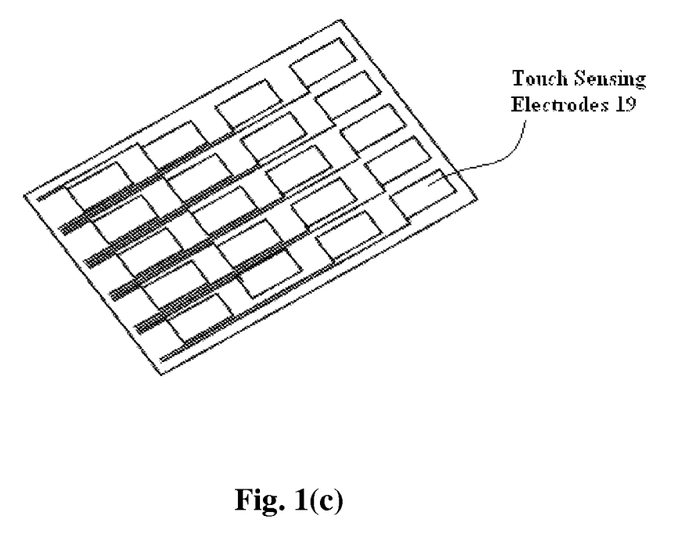
FIG. 1(c) illustrates a plane view of a layer of touch sensing electrodes according to embodiment 1 of the disclosure.

FIG. 1(c) illustrates an example of a layer of the touch sensing electrodes in the touch control display device according to embodiment 1 of the disclosure. The touch sensing electrodes may be equilateral polygonal, rhombic, elongated, circular or elliptic. Any of the touch sensing electrodes may also be triangular or in irregular shapes. In addition, edges of the touch sensing electrodes may be in the concave and convex structure. Preferably, the touch sensing electrodes may be made of Indium Tin Oxide (ITO) or Graphene.

It should be understood by those skilled in the art that, the touch sensing electrodes may be in the same or different shapes. For example, the touch sensing electrodes in the middle are rhombic while those at the edges are triangular. In addition, the touch sensing electrodes may be in the same or different dimensions. For example, the touch sensing electrodes in inner part are bigger while those at the edges are smaller, which is advantageous for the wiring and for the touch accuracy at the edges.

In an existing In-Cell touch control display device, a touch control portion includes row-electrodes and column-electrodes. The row-electrodes/column-electrodes extend on the touch screen from one side to an opposite side and occupy a long extent, and noises accumulate on each row/each column. For example, when a plurality of fingers touch on a same row or column, the noises from the fingers accumulate on the row or column and the resultant noise is increased.

By contrast, in the touch control display device according to the embodiment of the disclosure, the touch sensing electrodes are arranged in a two-dimensional array and each electrode is a unit in the array. Each row or column of the array consists of various units, there are no physical connections among the units, and the noises may not accumulate. Therefore, in the touch control display device according to the embodiment of the disclosure, a maximum noise is reduced and the Signal Noise Ratio is enhanced.

Embodiment 2

Figure 2A:
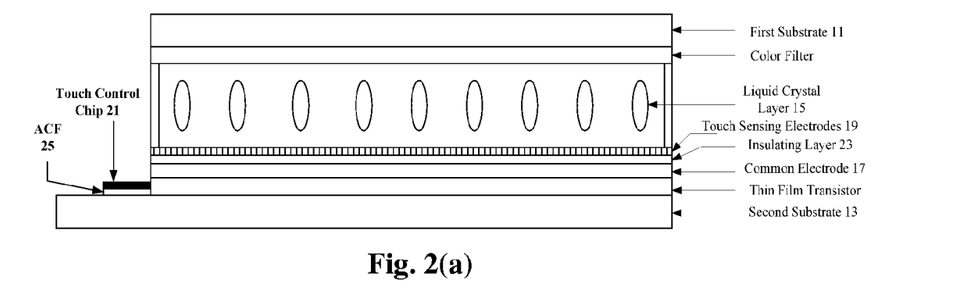
FIG. 2(a) and FIG. 2(b) are schematic side views of a touch control display device according to embodiment 2 of the disclosure.
Figure 2B:
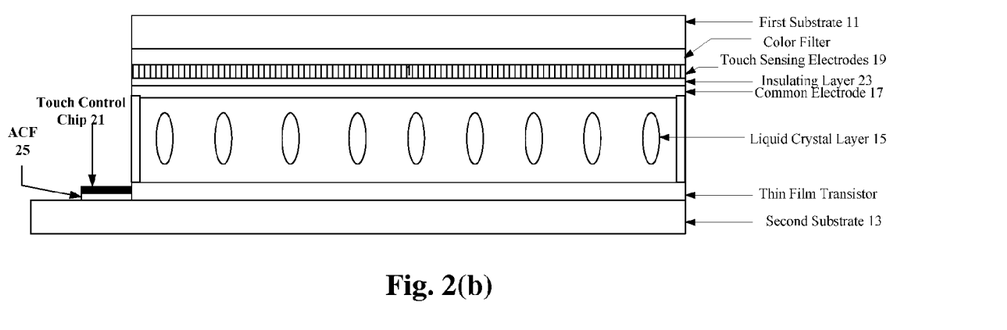

A touch control display device according to embodiment 2 of the disclosure may further comprise a touch control chip 21, where the touch control chip 21 is connected to each of the plurality of touch sensing electrodes 19 via a wire respectively, and the touch control chip 21 is bound onto the first substrate 11 or the second substrate 13 in Chip-on-Glass (COG) mode.

FIG. 2(a) is a schematic side view of an example of the touch display device according to embodiment 2 of the disclosure. Here the touch control display device has the IPS structure FIG. 2(b) is a schematic side view of another example of the touch control display device according to embodiment 2 of the disclosure. Here the touch control display device has the TN structure.

According to the embodiment, an insulating layer 23 is disposed between the common electrode 17 and the touch sensing electrodes 19, an Anisotropic Conductive Film (ACF) 25 may be disposed between the touch control chip 21 and the substrate.

Since each of the touch sensing electrodes 19 is connected to the touch control chip 21 via a wire, the number of pins of the touch control chip 21 may increase significantly. The touch control chip 21 is bound onto the substrate with the COG mode to avoid difficulties caused by conventional packaging. In conventional packaging, hundreds of pins result in a complicated packaging structure, e.g., an expensive Ball Grid Array (BGA). In addition, the BGA may only be made on a Printed Circuit Board (PCB) or a Flexible Printed Circuit (FPC), therefore the touch control chip 21 needs to be connected to each of the touch sensing electrodes 19 through the FPC.

Preferably, the wires for connecting the touch control chip 21 to each of the touch sensing electrodes 19 are arranged on a same layer as the touch sensing electrodes; or the wires are arranged on a layer different from the layer of the touch sensing electrodes and are connected to each of the touch sensing electrodes 19 through vias. Since the touch sensing electrodes are formed by etching a conductive layer (a metallic oxide such as the Indium Tin Oxide, or a metal) on the substrate and the touch control chip is also disposed on the same substrate, the connection wires between the touch sensing electrodes and the touch control chip can be achieved through one processing of etching, and the manufacturing process is simplified.

Generally the wires are as uniform and short as possible. In addition, the range of the wiring is as narrow as possible under the condition that a safe distance is ensured, thus more space is left for the touch sensing electrodes.

Optionally, each of the touch sensing electrodes may be connected to a bus by wires, and the wires can be connected to the touch control chip by the bus directly or after proper ordering. There can be numerous touch sensing electrodes in a large-scale touch screen. In this situation, a single touch control chip can be configured to control all the touch sensing electrodes; alternatively multiple touch control chips can be configured to control the touch sensing electrodes in different regions partitioned on the screen, and the multiple touch control chips can be synchronized with a clock. Here the bus can be divided into several bus groups to connect with different touch control chips, and each touch control chip may control the same number or different numbers of the touch sensing electrodes.

Descriptions about other components according to the embodiment may be referred to other embodiments and are not given here.

Embodiment 3

Figure 3:
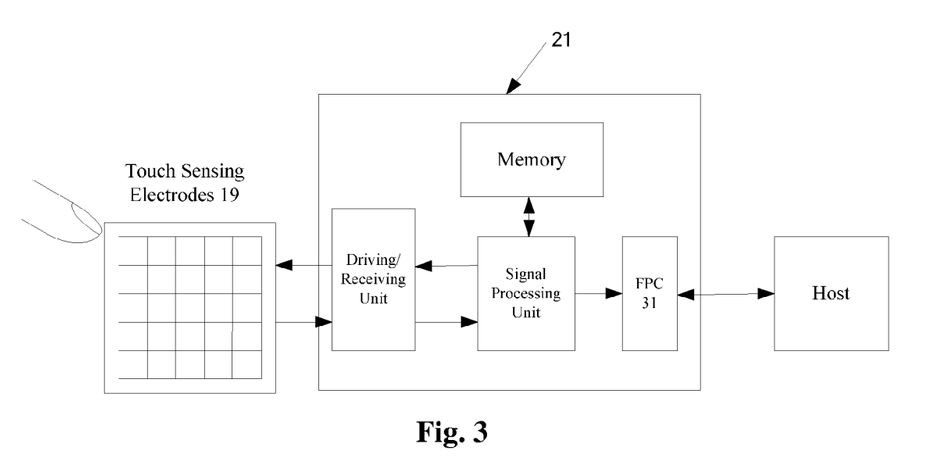
FIG. 3 is a schematic diagram of a touch control display device according to embodiment 3 of the disclosure.

In a touch control display device according to embodiment 3 of the disclosure, the touch control chip 21 is configured to detect the self capacitance of each touch sensing electrode and to determine a touch location based on a two-dimensional self capacitance sensing array.

As an example, the self capacitance of each touch sensing electrode may be the capacitance to the ground of the touch sensing electrode.

Preferably, the touch control chip 21 includes:

a driving/receiving unit, configured to drive the touch sensing electrodes with a voltage source or current source and to receive sensing data from the touch sensing electrodes; and a signal processing unit, configured to calculate the self capacitance of each touch sensing electrode based on the sensing data.

FIG. 3 is a schematic diagram of a touch control display device according to embodiment 3 of the disclosure.

Optionally, the touch control display device shown in FIG. 3 further includes a Flexible Printed Circuit (FPC) 31, where the FPC 31 is bound onto the first substrate 11 or the second substrate 13, and the FPC 31 connects the touch control chip 21 to a host.

Descriptions about other components according to the embodiment may be referred to other embodiments and are not given here.

Embodiment 4

In a touch control display device according to embodiment 4 of the disclosure, the touch control chip 21 is configured to detect the self capacitances of all the touch sensing electrodes simultaneously, or to detect the self capacitances of the touch sensing electrodes group by group.

In the prior art, since the touch sensing electrodes include the row electrodes and the column electrodes, a progressive scan is adopted and a touch detection time for each frame is long. This shortcoming will especially bring negative effects on an In-Cell touch control display device. In order to reduce the mutual interference between the operated liquid crystal display portion and the operated touch control portion, the operation of the touch control portion is stopped when the liquid crystal display portion is operated, and the operation of the liquid crystal display portion is stopped when the touch control portion is operated. For example, the In-Cell touch control display device with a working frequency of 60 Hz (i.e. 16.7 ms per frame) generally needs a scanning time for the display of 10-12 ms. Thus, the scanning time for detecting the touch is very short, leading to a lower signal to noise ratio for the existing In-Cell touch control display device. However, in the touch control display device according to the embodiments of the present disclosure, each of the electrodes is connected to a touch control chip. By using a parallel scanning mode, the scanning time for detecting the touch may theoretically be equal to the time for detecting one row in the prior art, which may achieve the signal to noise ratio in the prior art. For example, for an In-Cell touch control display device with 16 rows and 28 columns, it is assumed that the time for detecting each row is T, and then 16 Ts are spent in scanning the existing structure. However, the shortest time for detecting the touch for each frame is only 1 T, according to the structure of the embodiments of the present disclosure.

Descriptions about other components according to the embodiment may be referred to other embodiments and are not given here.

Embodiment 5

A touch control display device according to embodiment 5 further includes a display control circuit. The touch control display device repeats a first step in which the display control circuit scans one frame and then a touch control circuit provided in the touch control chip 21 scans one frame. That is to say, firstly a display scan for one frame is performed and then a touch detection scan for one frame is performed, and over and over again.

Alternatively, the touch control display device repeats a second step in which the touch control circuit scans one frame and then the display control circuit scans one frame. That is to say, firstly the touch detection scan for one frame is performed and then the display scan for one frame is performed, and over and over again.

Furthermore, for each frame, the display scan may be divided into multiple segments, the touch detection scan is performed in each of the segments. In this way, the frequency of the touch detection is multiple times as large as the frequency of the display. Therefore, the frame rate of the touch detection is increased. In other words, each frame scan performed by the display control circuit is divided into multiple segments, and the touch control circuit performs the scan every time before and after the scan performed by the display control circuit and between the segments.

Descriptions about other components according to the embodiment may be referred to other embodiments and are not given here.

Embodiment 6

In a touch control display device according to embodiment 6 of the disclosure, the driving/receiving unit is configured to drive the touch sensing electrodes in the simultaneous driving mode.

Specifically, the simultaneous driving may includes one of the following or any combination thereof:

A: the driving/receiving unit is configured to, when driving each touch sensing electrode, drive the rest of the touch sensing electrodes simultaneously based on a signal applied on the touch sensing electrode.

B: the driving/receiving unit is configured to, when driving each touch sensing electrode, drive touch sensing electrodes peripheral to the touch sensing electrode simultaneously based on the signal applied on the touch sensing electrode.

C: the driving/receiving unit is configured to, when driving each touch sensing electrode, drive the common electrode simultaneously based on the signal applied on the touch sensing electrode.

D: the driving/receiving unit is configured to, when driving each touch sensing electrode, drive a data line in a corresponding pixel unit simultaneously based on the signal applied on the touch sensing electrode.

Because each of the touch sensing electrodes 19 is connected to the touch control chip 21 via a wire, the amount of the wires is large, the wiring is very narrow in the case that the area is limited; hence, the resistance is increased and the quality of detection signal is affected. With the simultaneous driving mode, differences between the voltages of the electrode being detected and the electrodes not being detected are reduced, and it is advantageous to reduce the capacitance of the electrode being detected and to prevent a false touch caused by a water drop.

Descriptions about other components according to the embodiment may be referred to other embodiments and are not given here.

Embodiment 7

In a touch control display device according to embodiment 7 of the disclosure, the sensing data may represent voltages, frequencies or electric quantities of the touch sensing electrodes.

Optionally, the voltage source or current source may have two or more frequencies.

Optionally, the touch control chip may further be configured to adjust sensitivity or a dynamic range of touch detection through parameters of the voltage source or current source, and the parameters include one of amplitude, frequency, time sequence or any combination thereof.

Descriptions about other components according to the embodiment may be referred to other embodiments and are not given here.

Embodiment 8

In a touch control display device according to embodiment 7 of the disclosure, in the case that the data of a current frame is invalid (a valid signal may be reduced in the case that the polarities of the noise and the driving source are opposite; data of the current frame becomes invalid if the reduced valid signal is not detectable.), the data of the current frame may be recovered with data of multiple frames. It should be understood by those skilled in the art that, a normal report rate may not be affected by the processing with the data of the multiple frames because the scan frequency of touch detection is higher than a practically required report rate.

Similarly, in the case that the noise goes beyond the dynamic range of the system in a limited amount, the current frame can also be recovered through the date of the multiple frames to obtain the right touch location. This method of inter-frame processing is also applicable for RF interference and interference from other noise sources such as a liquid crystal display portion.

Differences from other embodiments are highlighted in each embodiment of the specification, and the same or similar parts of the embodiments can be referred to each other.

The invention may be practiced or applied by those skilled in the art based on the above illustration for the disclosed embodiments. Various modifications to the embodiments are apparent for the skilled in the art. The general principle suggested herein can be implemented in other embodiments without departing from the spirit or scope of the invention. Therefore, the present invention should not be limited to the embodiments disclosed herein, but has the widest scope that is conformity with the principle and the novel features disclosed herein.

The invention claimed is:

1. A touch control display device comprising:
   a first substrate, a second substrate, a liquid crystal layer disposed between the first substrate and the second substrate, a common electrode and a plurality of pixel units;
   a plurality of touch sensing electrodes disposed above the common electrode, wherein the plurality of touch sensing electrodes are arranged in a two-dimensional array; and
   a touch control chip, wherein the touch control chip is connected to the touch sensing electrodes via respective wires, and wherein the touch control chip is bonded, in a Chip-on-Glass mode, to the first substrate or the second substrate.

2. The touch control display device according to claim 1, wherein shapes of the touch sensing electrodes are one or more of equilateral polygonal, rhombic, elongated, circular or elliptic.

3. The touch control display device according to claim 2, wherein the touch sensing electrodes are in a concave and convex structure.

4. The touch control display device according to claim 1, wherein the plurality of touch sensing electrodes are made of Indium Tin Oxide or Graphene.

5. The touch control display device according to claim 1, wherein
   the wires and the plurality of touch sensing electrodes are arranged on a same layer; or
   the wires are arranged on a different layer from the plurality of touch sensing electrodes and are connected to the plurality of touch sensing electrodes through vias.

6. The touch control display device according to claim 1, wherein the touch control display device further comprises:
   a Flexible Printed Circuit bound onto the first substrate or the second substrate and connected to the touch control chip.

7. The touch control display device according to claim 1, wherein
   the touch control chip is configured to detect a self-capacitance of each touch sensing electrode and to determine a touch location based on a two-dimensional self-capacitance sensing array.

8. The touch control display device according to claim 7, wherein the touch control chip comprises:
   a driving/receiving unit, configured to drive the touch sensing electrodes with a voltage source or current source and to receive sensing data from the touch sensing electrodes; and
   a signal processing unit, configured to calculate the self-capacitance of each touch sensing electrode based on the sensing data.

9. The touch control display device according to claim 8, wherein
   the driving/receiving unit is configured to drive the touch sensing electrodes with a simultaneous driving mode.

10. The touch control display device according to claim 8, wherein
    the sensing data represents voltages, frequencies or electric quantities of the touch sensing electrodes.

11. The touch control display device according to claim 8, wherein
    the voltage source or current source have two or more frequencies.

12. The touch control display device according to claim 8, wherein
  the touch control chip is further configured to adjust sensitivity and/or dynamic range of touch detection through parameters of the voltage source or current source, and the parameters comprise one of amplitude, frequency, time sequence or any combination thereof.

13. The touch control display device according to claim 7, wherein
  the touch control chip is configured to detect the self-capacitances of the plurality of the touch sensing electrodes simultaneously or to detect the self-capacitances of the touch sensing electrodes group by group.

14. The touch control display device according to claim 1, wherein
  the touch control display device has an In-Plane Switching structure and the plurality of touch sensing electrodes are located on a side of the common electrode facing the liquid crystal layer; or
  the touch control display device has a Twisted Nematic structure and the plurality of touch sensing electrodes are located on the other side of the common electrode opposite to the side facing the liquid crystal layer.

\* \* \* \* \*